United States Patent [19]

Burgess

[11] 4,389,048

[45] Jun. 21, 1983

[54] APPARATUS FOR PLAYING A SPECTATOR-CONTROLLED GAME

[76] Inventor: Donald M. Burgess, 7A Sidney Pl., London, England, SW7 3NL

[21] Appl. No.: 329,194

[22] Filed: Dec. 10, 1981

Related U.S. Application Data

[63] Continuation-in-part of Ser. No. 83,152, Oct. 5, 1979, abandoned.

[30] Foreign Application Priority Data

Oct. 7, 1978 [GB] United Kingdom ............... 39715/78

[51] Int. Cl.³ .......................... A63F 7/02; A63F 9/22
[52] U.S. Cl. ............................ 273/121 A; 273/129 V; 273/85 G; 273/DIG. 28; 273/DIG. 31
[58] Field of Search ....................... 273/118 A–121 A, 273/1 GC, 1 E, 85 G, 237, DIG. 28, 109, 110, DIG. 31, 129 V; 434/237

[56] References Cited

U.S. PATENT DOCUMENTS

| | | | |
|---|---|---|---|
| 2,491,335 | 12/1949 | Rich | 364/409 |
| 3,231,276 | 1/1966 | Cooper | 273/94 |
| 3,556,525 | 1/1971 | Pegg | 273/85 G |
| 3,578,802 | 5/1971 | Murphy et al. | 273/118 A |
| 3,778,058 | 11/1973 | Rausch | 273/1 E |
| 3,874,669 | 4/1975 | Ariano et al. | 273/85 G |
| 4,017,072 | 4/1977 | Kurtz | 273/1 E |
| 4,026,555 | 5/1977 | Kirschner et al. | 273/85 G |
| 4,093,223 | 6/1978 | Wilke et al. | 273/85 G |
| 4,093,232 | 6/1978 | Nutting et al. | 273/121 A |
| 4,126,851 | 11/1978 | Okor | 273/85 G |
| 4,162,792 | 7/1979 | Chang et al. | 273/85 G |
| 4,181,309 | 1/1980 | Atkinson et al. | 273/186 R |
| 4,193,598 | 3/1980 | Freese | 273/DIG. 28 |
| 4,198,051 | 4/1980 | Bracha et al. | 273/121 A |
| 4,244,574 | 1/1981 | Milner et al. | 273/121 A |
| 4,269,163 | 5/1981 | Feith | 273/29 A |

FOREIGN PATENT DOCUMENTS

| | | |
|---|---|---|
| 526780 | 5/1955 | Italy . |
| 408862 | 4/1934 | United Kingdom . |
| 507500 | 6/1939 | United Kingdom . |
| 689377 | 3/1953 | United Kingdom . |
| 1193362 | 5/1970 | United Kingdom . |
| 1505056 | 3/1978 | United Kingdom . |

OTHER PUBLICATIONS

Kris Jensen, "New 1978 Electronic Games", Popular Electronics, Jan. 1978, pp. 33–43.

Primary Examiner—Vance Y. Hum
Assistant Examiner—Leo P. Picard
Attorney, Agent, or Firm—Tilton, Fallon, Lungmus & Chestnut

[57] ABSTRACT

Apparatus for playing a spectator-controlled game including a playfield and an object (e.g. a ball) which is movable over the playfield under the control of an audience of spectators. The playfield described includes selectively controllable means for impelling a ball and means for obstructing the ball, and various non-controllable forms of ball obstructing devices. The spectators have control devices having push-buttons for selecting one of a plurality of output 'vote' signals, for obstructing the ball, or impelling it in any one of four specific directions. A programmable controller embodying a decision-making logic system provides control signals for activating the respective impelling and obstructing devices in response to predetermined majorities of vote signals provided by the spectators' control devices, so that the ball is impelled and obstructed in accordance with the majority wishes of the spectators. The spectators play simultaneously, preferably in opposing teams, throughout the games, and in direct competition to control the ball, and have to make their choices rapidly to avoid having their vote signals discounted. The playfield and ball impelling and obstructing devices may comprise discrete physical objects or visual images formed electronically on a screen.

12 Claims, 4 Drawing Figures

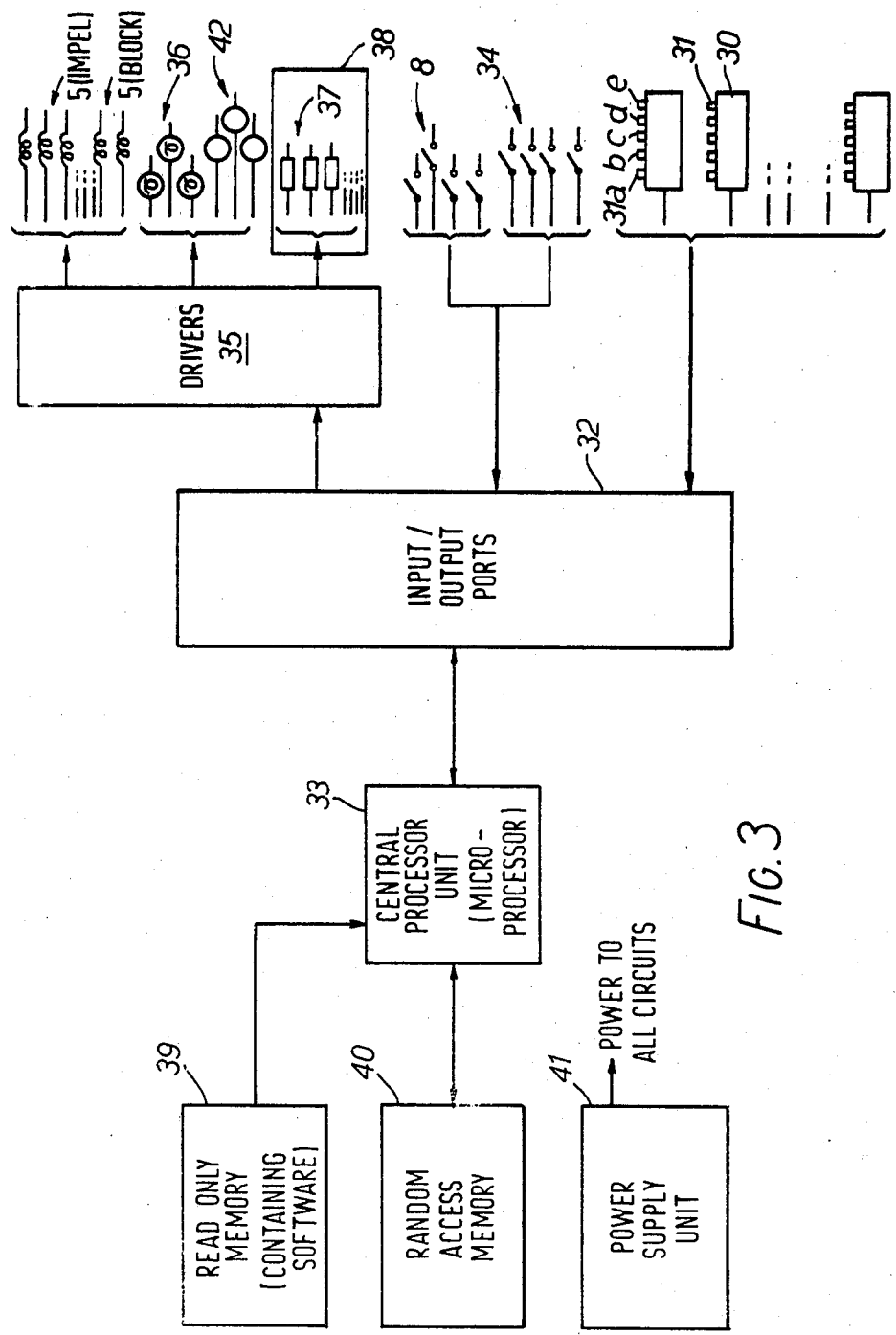

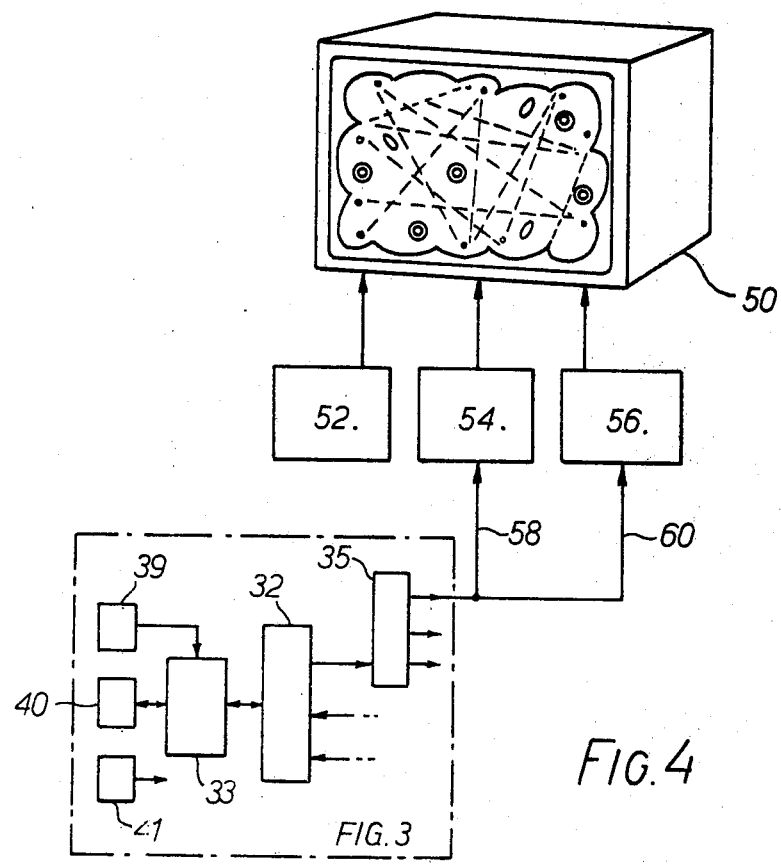

APPARATUS FOR PLAYING A SPECTATOR-CONTROLLED GAME

This is a continuation-in-part of application Ser. No. 083,152, filed Oct. 5, 1979 now abandoned.

FIELD OF THE INVENTION

This invention relates to apparatus for playing a spectator-controlled game involving movement of a played object (e.g. a ball) over a playfield under the control of spectator-players.

BACKGROUND OF THE INVENTION

In the past such games have customarily been played by a single spectator player (hereinafter referred to simply as a 'player'), playing alone against the cunning of the apparatus, and seeking only the reward of a high score or else some payment for achieving a certain result. Where such games have been capable of being played by more than one player, they customarily involved a manner of play in which each player played the game in turn against the apparatus to achieve a high score, that is, the players played sequentially. There was no simultaneous play by the various players, and there was thus no contest among them to outwit one another in playing the game. Examples of such sequentially-played games are disclosed in the U.S. Pat. Nos. 4,093,232 and 4,198,051 which disclose pinball games, and moreover the use in such games of programmed logic means in the form of microprocessors.

Furthermore, in such prior art games where the player had the option to impel a movable object such as a ball, the only choice before the player lay in the timing of the impelling action so as to strike a moving ball at the right instant. There was no choice of specific direction in which to impel the ball, nor was there an option to impede the ball rather than to impel it.

Other spectator-controlled games involving the use of micro-processors are disclosed in the U.S. Pat. Nos. 4,026,555 and 4,093,223. However, in those games, only two players exercise, in turn, their specific choices to determine the play of the movable object. In the former specification the players have a choice of, inter alia, the direction in which to impel the movable object, whilst in the latter specification the players are penalized for, inter alia, their failure to make a choice within a prescribed time interval.

The present invention seeks to provide apparatus for playing a game in which at least three players can play simultaneously throughout the game, preferably as opposing teams, to determine the movement of a movable object. Moreover, the present invention seeks to provide a game in which each player has to select one of a plurality of different options, including the option to impel or obstruct the object, and the option to impel the object in one of a plurality of different directions. Additionally, the present invention seeks to provide a game in which the players need to exercise their options with great speed so as to avoid having their choices discounted.

BRIEF SUMMARY OF THE INVENTION

According to the present invention, an apparatus for playing a spectator-controlled game comprises—
means constituting a playfield for playing said game;
means constituting at least one object movable over the playfield under the control of at least three spectators when playing said game;
at least one controllable object-influencing means for causing or modifying movement of said object over said playfield in one of a plurality of different ways, when activated by an appropriate kind of control signal;
a plurality of control means, each being operable by a respective spectator when playing said game to select and supply a desired one of a plurality of possible output signals for controlling the operation of said object-influencing means; and
a decision-making logic system connected (a) to the respective said control means so as to receive therefrom said output signals selected by said spectators, and (b) to said object-influencing means so as to supply thereto in response to said received output signals and as said control signal a signal dependent on a predetermined majority of one sort of said received output signals over the other sorts of said received output signals, whereby to cause said object-influencing means to respond to the expressed wishes of a predetermined majority of the spectators operating the respective control means.

Other features of the present invention will appear from the description that follows hereafter, and from the claims appended at the end of that description.

One apparatus for playing a spectator-controlled ball game according to the present invention will now be described by way of example and with reference to the accompanying diagrammatic drawings.

BRIEF DESCRIPTION OF THE DRAWINGS

FIG. 3 shows a schematic diagram of the principal electrical circuit components associated with the said ball controlling devices on the playfield, for controlling the course of the game and keeping a score; and FIG. 4 shows a schematic diagram of the principle components of an alternative, electronic simulation form of the said apparatus, in which the playfield, the various ball-playing and ball-obstructing devices are all simulated or represented on an electronically controlled, electronic, visual image producing screen.

DETAILED DESCRIPTION OF EMBODIMENT

Figure 1:
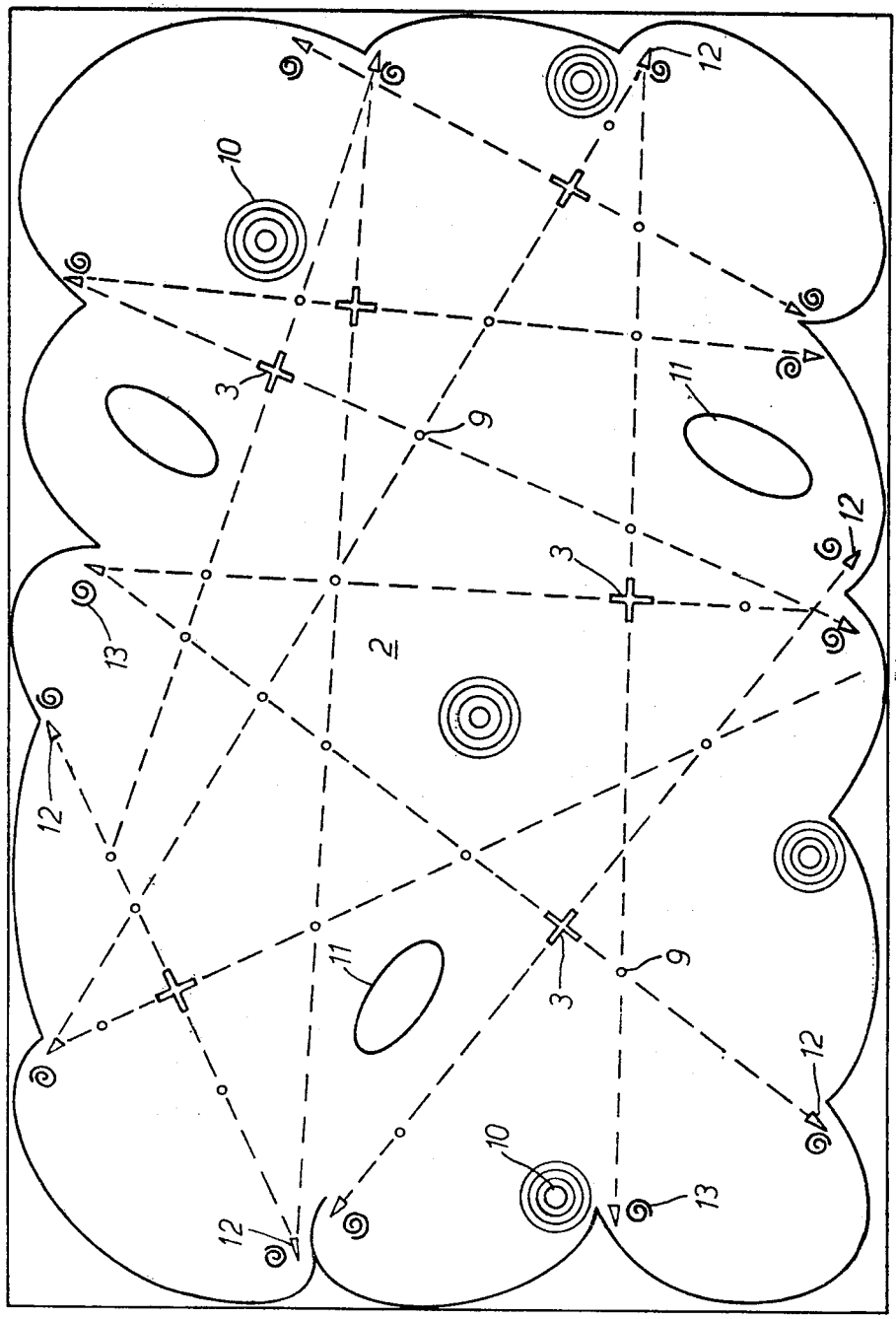
FIG. 1 shows in plan view a playfield on which said game is to be played, and having various ball playing and ball obstructing devices (i.e ball influencing or controlling devices) disposed at various locations thereon.

Referring now to the drawings, the apparatus includes a playfield 2, shown in plan view in FIG. 1 and in section in FIG. 2, over the upper, playing surface of which a played object, in this case a ball 1 is to be played, or propelled, by impeller hammers 4 pivotally mounted below the playfield and arranged to pivotally rise, on actuation, through slits formed in the playfield at strategic locations 3 so as to strike or 'fire' the ball when standing at such a location.

The playing surface of the playfield is of an undulating character, and the said locations 3 are disposed at the bottoms of dips in that surface, so that a spent or 'dead' ball will always descend to a position adjacent an impeller hammer 4 in readiness for firing again.

At each such location 3 there is provided a set of four such impeller hammers arranged mutually at right angles around the bottom of the dip at that location, so that their respective slits in the playfield form a cross-shaped opening, as shown in FIG. 1. Those openings have different orientations at different said locations 3, also as shown in FIG. 1. Thus, by choice of the impeller hammer to be actuated at any such location 3, the ball may be selectively impelled or fired in any desired one of the four possible directions (e.g. 'North', 'South', 'East' and 'West').

Figure 2:
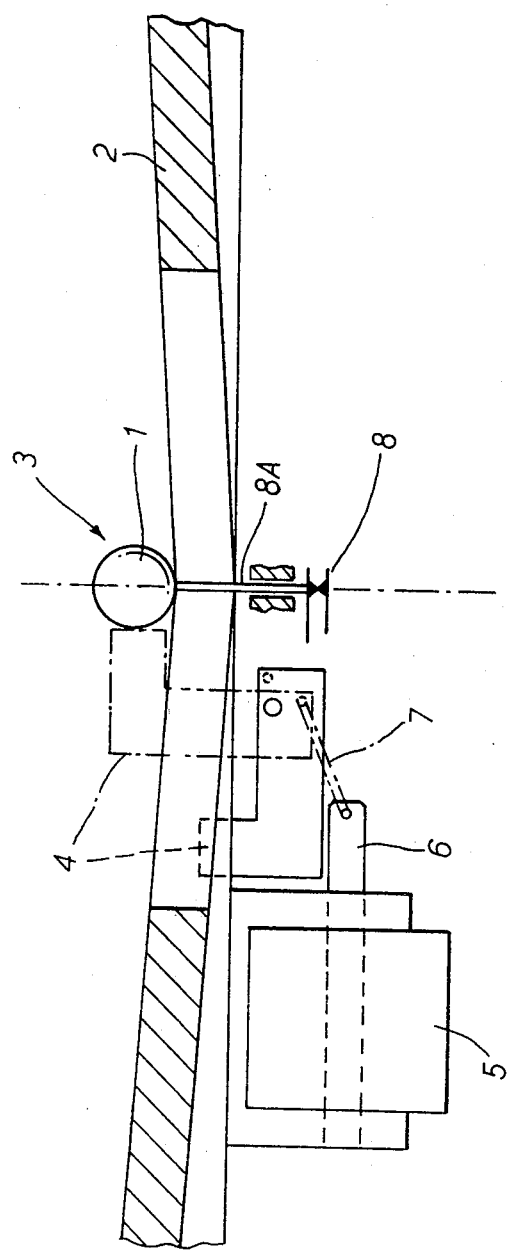
FIG. 2 shows in side elevation an impeller device, constituting one of said ball-playing devices, mounted below the playfield, the latter being shown in vertical section.

As shown in FIG. 2, each impeller hammer is electromagnetically actuated, to fire the ball, through a link 7 by a plunger 6 on energization of an associated solenoid 5 of a laminated electromagnet, the hammer being pivoted thereby vertically from a horizontal quiescent position (shown by full and dotted lines) to the vertical, fire or strike position (shown by chain-dotted lines).

To provide an indication that a ball is lying ready for firing at the centre of such an aforesaid cross-shaped opening at the bottom of a dip in the playing surface, there is provided at each such location 3 a vertical push-rod 8A and an associated pair of normally-open electrical contacts 8. Thus, the presence of the ball over and depressing such push-rod provides by closure of those contacts 8 completion of an associated electrical indication circuit.

Also mounted under the playfield, at various strategic positions 9 along the possible paths of the ball from the various impellers (such paths being shown in FIG. 1 as dotted lines passing through the locations 3 and aligned with the respective impellers) are various ball-obstructing devices or obstacles in the form of pivoted ball-blocking posts. The latter are generally similar to the impeller hammers 4 already described, and have actuating means generally similar to those provided for such hammers 4. Energization of the associated electromagnet solenoid raises such a blocking post from its horizontal, quiescent position below the playfield to its vertical, blocking position projecting through a slit in the playfield.

The playfield also carries other ball-obstructing devices or obstacles. These include (a) constantly spinning discs 10 whose function is to throw off the ball, when it comes into contact therewith, along unpredictable paths over the playfield, and (b) bumpers (or fenders) 11 arranged when hit by the ball to operate electrical contacts (not shown) connected in circuits provided for scoring purposes and for providing illumination of local indicating lamps.

The playfield has a boundary wall shaped in plan view in the manner shown in FIG. 1, the function of that wall being to sweep an outwardly-moving ball around a curved path and back into the central area of the playfield. At various appropriate positions as shown in FIG. 1 conventional roll-over devices 12 and associated guides 13 are provided, being variously of metal or rubber construction.

To enable a ball game to be played on the playfield, the aforesaid apparatus also includes an electrical control and score system, of which the principal components and their interconnections are shown schematically in the block diagram of FIG. 3. Referring now to that Figure, each intending spectator-player (hereinafter referred to simply as a 'player') is provided with a player's control device, in the form of a handset 30 having thereon five manually-operable push-buttons or keys 31a-e, so that each player on being required to make a selection of the next action to be performed on the ball has the choice of five possible control actions. Four of those push-buttons 31a-d relate to the actuation of the respective ones of the four impeller hammers 4 at at least the relevant location 3, whilst the fifth push-button relates to the actuation of obstacles or blocking posts disposed at positions 9 in the paths along which the ball may be fired next.

The respective electrical ciruits controlled by the respective push-buttons 31a-e pass via an input/output port system 32 to a programmable controller (or data processor) embodying a decision-making logic system, here constituted by a central processor unit 33 (CPU) of conventional form and provided as a micro-processor. Thus, operation of the respective pushbuttons 31a-e provides input signals of the respective kinds to the central processor unit for use therein.

For playing a game between two opposing teams (here identified for convenience as the 'Red team' and the 'Green team') the control devices to be used by the respective teams are appropriately identified by red and green coloring, and are appropriately identified to the central processor unit by the different kinds of output signals they provide.

The aforesaid ball-operated contacts 8 disposed at the respective locations 3 are also connected via the port system 32 to the central processor unit 33, and thus provide signals thereto at appropriate times when a next ball-controlling action needs to be selected by the players. Likewise, the aforementioned contacts (34) operated by the respective bumpers 11 provide input signals to the central processor unit via the port system 32.

Also connected to the central processor unit 33 via the port system 32 are a plurality of electrical drivers 35 for energization by various output signals provided by the central processor unit. The respective drivers 35 have output circuits connected to supply the various solenoids 5 of the impellers and blocking posts, various lamp circuits 36 to be explained later, and various counter display devices 37 associated with a scoreboard 38.

The central processor unit 33 is also connected with a 'Read-only' memory 39 (ROM) which is arranged to store a game program for controlling the operation of the central processor unit 33 during the course of the game, that program being arranged to embody the rules of the game (a) for controlling the procedure to be followed in playing the ball in response to the input signals received from the players' control devices and from the other devices on the playfield, and (b) for scoring in the desired manner.

Also connected with the central processor unit 33 is a 'Random-access' memory 40 for use in a conventional manner by the central processor unit in performing its normal functions in response to the requirements of the program stored in the ROM 39.

A power supply unit 41 supplies power to all of the various power-requiring circuits described above, at the respective required voltages, currents, etc.

Associated with the respective ball impelling and obstructing devices at locations 3 and positions 9 respectively are electrical indication lamps 36 and tone generators 42 arranged to be energized by appropriate driver circuits 35 in response to appropriate output signals received from the central processor unit 33, whereby (a) to indicate to the players visually and audibly when they should make their selections to impel or obstruct the ball, and subsequently (b) to indicate visually and audibly which team of players was successful in causing the ball to be fired or obstructed.

In the course of playing a game between opposing "Red" and "Green" teams of players, the apparatus functions as follows:

When the ball comes to rest in the bottom of a dip at a location 3, the associated ball-operated contacts 8 close to provide a signal to the CPU, which thereupon supplies via the port system 32 an energizing current to illuminate the indication lamp 36 (a white lamp) disposed at that location and activate the associated tone generator 42, and simultaneously starts a timing means counting through a predetermined time interval (of the order of one half second) which represents a "window of time" for receiving input signals via the port system 32 from the respective player's control devices 30. The illumination of that indication lamp 36 signifies to the players the need for them to make a rapid choice of the next control action for restarting and continuing play, and to operate accordingly the appropriate push-button 31a-e of their control devices 30 whereby to supply appropriate output signals to the CPU. All such player's output signals received by the CPU during the count-down of that time interval are processed thereby to determine according to the rules of the game embodied in the ROM program what action should be taken in response to those output signals.

Thus, the CPU assesses (a) which team has provided the greater number of ball-controlling signals of the same kind, i.e. ball-impelling signals or ball-obstructing signals, and accordingly provides a first control signal to cause energization of the appropriate one of the solenoids 5 of the relevant ball impelling or obstructing devices, and (b) which of the four possible directions for impelling the ball has been signified by the greatest number of ball-impelling signals of the same kind, and accordingly provides a second control signal to cause energization of the appropriate one of the solenoids 5 of the relevant ball-impelling devices. Thus, the ball is impelled in the direction signified by the majority of the ball-impelling signals, and the ball is subsequently obstructed at a position 9 only if the ball-obstructing signals had been found to outnumber the ball-impelling signals.

The CPU also provides output signals for causing illumination of appropriately-colored indication lamps 36 at the location 3, and if relevant at the position 9, to indicate the team that was successful in having the majority of input signals in favor of impelling or, where appropriate, obstructing the ball.

Input signals received from the player's control devices 30 after the time interval has been counted out are of no consequence in influencing the further course of the game.

The CPU acting under the control of the program in the ROM keeps and progressively updates the scores of the respective teams as the game progresses.

Thus, in response to a said ball-impelling control signal provided by the CPU (i.e. for causing a ball at a location 3 to be fired), the score of the relevant team is updated by the CPU by an appropriate predetermined increment (e.g. 100 points), whereas in response to a said ball-obstructing control signal provided by the CPU (i.e. for causing an obstruction of the ball path) the score of the relevant team is updated by an amount of, for example, twice that given for a said ball-impelling control signal.

The CPU, acting in response to its scoring program instructions, also responds to scoring input signals received via the port system 32 from the circuits which include various ones of the switches 34 actuated by the various bumpers 11 and roll-over devices 12. Thus, a roll-over device signal adds a further increment to the score of the hitting (i.e. impelling) side, that is, in the event that the ball is not obstructed, whereas a bumper device signal cancels the last increment added to the score of the hitting side.

The end of a game is reached when the CPU determines that a predetermined score has been reached by the winning team, or that a predetermined playing time has elapsed.

The ROM program includes a tie-breaking instruction routine for handling the condition where the total of the ball-impelling signals received is equal to the total of the ball-obstructing signals received. Thus, the said first control signal will be given by the CPU, in dependence upon a randomly generated signal, in favor of one team on a purely random basis. In an alternative arrangement that control signal may be given, in dependence upon an ongoing assessment of past performance of the respective teams, in favor of the team having the better past performance.

Likewise, the tie-breaking instruction routine is arranged to handle the condition where two or more ball-impelling directions are selected by equal numbers of players, by giving preference to one direction in dependence upon a randomly generated signal, though in an alternative arrangement preference may be given to the direction that has been selected most frequently in the past.

The outcome of a game is dependent on both (a) the skill of the player in selecting a course of action such as will maximize his team's potential for scoring (different ones of the said ball paths of FIG. 1 offering different possibilities for scoring, and also having different potential hazards) and then depressing the appropriate push-button within the preset "window of time", and (b) certain randomly-operative factors resulting from contact of the ball with, for example, a spinning disc 10, a roll-over device 11 or a guide 13, and from the physical features of the playing surface of the playfield. The rules to be followed in playing the game may be altered by altering the program stored in the ROM 39.

Whereas in the apparatus just described a spent ball moves under gravity into a firing position 3, in other forms of the apparatus other effects, for example, magnetism, may be used to return a spent ball to a firing position.

If desired, the CPU may also receive and be influenced by audio signals provided by microphones placed strategically around the playfield. Thus, the CPU may in assessing the signals received from the player's control devices modify its assessment of those signals in dependence upon the level of cheering or shouting sensed by the microphones.

In a typical small-scale version of the apparatus described above, the playfield is of table-top size (i.e. such as may be readily accommodated on an ordinary dining table), in which case the ball conveniently comprises a ball bearing of one half-inch diameter.

However, it is also contemplated that on a much larger scale, the playfield would be the size of a tennis court, and the game played with an appropriately larger ball. In this latter case, the playfield is conveniently made of a glass-fibre reinforced plastics material such as that commercially available in the UK under the Trade Mark "Fibreglass", being constructed in sections and joined together to provide the desired configuration for the playing surface. Rearrangement of those sections offers the possibility of readily varying the configuration of the playing surface.

With a large size of playfield as just envisaged above, as many as three or four thousand spectators can participate simultaneously in playing the game. Moreover, such spectators need not be physically present alongside the playfield, since they may participate in the game by remote control, observing the playfield and the course of the game on a TV screen, and making their selections by means of control devices connected to, and capable of transmitting the spectator's selected signals via external telephone cables to the central processor unit disposed adjacent the playfield.

When large numbers of spectator-players are to play simultaneously, it may be necessary, in the interests of providing a more speedy assessment of the output signals provided by the players' control devices, to use some conventional form of parallel pre-processing of groups of those output signals, so that only the results of that pre-processing are conveyed to the central processor unit. The game may be played by any number of players up to the limit set by the available number of player control devices, the players being preferably divided into, and playing as, opposing teams.

Though in the above described embodiment, there is provided at each location 3 an arrangement of four separate ball-impelling devices (4-7), in an alternative modified form of playfield there is provided at each such location but a single impelling device (4-7) suitably mounted on a turntable having driving means for rotating the turntable whereby to align the impelling device, as required by control signals emitted by the CPU, with a desired ball-impelling path on the play-surface. With such an arrangement the CPU is arranged to provide a control signal for controlling the alignment of the ball-impelling device before providing a ball-impelling signal.

Whereas in the program for controlling the CPU it is arranged that when the ball is to be impeded by a blocking device, only the relevant blocking device is activated, as an alternative the said program may be arranged to activate all or a selected group of the blocking devices.

One example of a set of algorithms for enabling the game to be played is given in an appendix at the end of this description. In those algorithms, the following terms have in relation to the embodiment described above the following meanings:

'guns'—ball-impelling devices
'blocks'—ball-obstructing devices
'reaction timer'—the timing means for counting down said predetermined time interval during which the players choices are effective
'to poll'—to scan, thereby to determine the output signal
'a vote'—a player's choice as represented by the output signal of his handset
'to shoot'—to impell the ball
'to block'—to obstruct the ball Though the apparatus described above relates to a 'football-type' game in which a ball is 'kicked' around a playfield, the principles of the apparatus and its mode of operation may equally well be applied to other forms of spectator-controlled games, for example—war games involving the movement of model tanks and movement and firing of model guns all under the control of the spectator-players, and car racing games involving for example acceleration, deceleration and direction changing of self-propelled model racing cars under the control of the spectator-players.

Any appropriate set of rules and protocols of a game can be readily embodied in a program for incorporation in the aforesaid read-only memory associated with the central processor unit, so that a large number of different games can be played using the principles of the present invention. However, a standarized form of spectator-player's control device involving the requisite push-buttons, keys and microphones could be adopted to reduce the costs of producing the hardware.

Though the embodiment of the present invention described in detail above involves the provision of a board constituting the playfield and electro-mechanically operated means for physically displacing a movable object over that playfield, the principles of the present invention may equally well be used in playing corresponding games in which the playfield and movable object are instead represented by visual images produced on, for example, the screen of a cathode ray tube (e.g. a TV tube), the electronic circuitry for altering the position of the movable object on that screen being controlled by the output signals of a central processor unit as described in relation to the electromechanically operated embodiment disclosed.

Referring now to the FIG. 4, in said alternative electronic form of the said apparatus an electronically controllable visual image producing screen 50 (e.g. a conventional form of colour TV tube or light emitting diode array) is connected with first, second and third electronic signal generators 52, 54, 56, and receives (a) from generator 52 electronic signals for producing on said screen a visual image representing the playfield depicted in FIG. 1;

(b) from generator 54 electronic signals for producing on said screen a visual image representing the ball 1 of FIG. 2; and (c) from generator 56 electronic signals for producing on said screen visual images representing the said ball-impelling and ball-obstructing devices located at the said positions 3 and 9 respectively on the playfield of FIG. 1.

Output control signals from the CPU 33 of FIG. 3 for controlling the ball-impelling and ball-obstructing devices are supplied via the output port system 32 and drivers 35 to the second and third signal generators 54, 56 via connections 58, 60 to cause them to vary their respective output signals supplied to the screen 50 in appropriate predetermined manners, whereby to cause the image representing the ball 11 to move across the screen in a manner simulating the motion of the ball 1 on the playfield 2.

Various examples of games played on video screens and using electronic signal generators generally similar to the said generators 52, 54, 56 and microprocessors have been referred to in an article entitled "New 1978 Electronic Games", published in the journal "Popular Electronics" in January 1978 at pages 33–43. Thus, no further explanation and detail of the generators 52, 54, 56 and their manner of working with the screen 50 is deemed necessary here.

The invention is not to be construed as limited to the particular forms described above, since that is to be regarded as illustrative rather than restrictive.

APPENDIX

Algorithms

Initialisation

1. On power-up or when a new game is selected, set the hardware and software to their initial conditions. Set both scores to zero, switch off all lamps and de-energise all guns and blockers.
2. Wait until a ball is present on one of the guns.
3. Start the reaction timer and switch on the white lamp adjacent to the gun in use.

Handset scanning

4. Poll all handsets sequentially. Each handset must be in its standby mode (no buttons depressed) before it is elegible to be polled.
5. If several buttons on a handset are pressed simultaneously, only that button having the highest priority is valid.
6. If a vote has already been registered for a handset, a subsequent vote during the reaction time replaces the previous vote.
7. If the reaction time has not yet elapsed, go to Step 4.
8. If no votes were registered during the reaction time, go to Step 4.

Vote processing

9. Note: The following symbols are used:
   PR = Number of players in Red team
   PG = Number of players in Green team
   NR = Number of North votes registered by Red team
   SR = Number of South votes registered by Red team
   ER = Number of East votes registered by Red team
   WR = Number of West votes registered by Red team
   BR = Number of Block votes registered by Red team
   NG = Number of North votes registered by Green team
   SG = Number of South votes registered by Green team
   EG = Number of East votes registered by Green team
   WG = Number of West votes registered by Green team
   BG = Number of Block votes registered by Green team
   abs[ ... ] denotes the absolute (unsigned) value of the argument
10. Calculate the unweighted Shoot votes for Red and Green teams as follows:

$$UWSVR = abs[NR - SR] + abs[ER - WR] - BR$$

$$UWSVG = abs[NG - SG] + abs[EG - WG] - BG$$

Divide these by the number of players in each team to obtain the weighted Shoot votes for Red and Green teams:

$$WSVR = UWSVR/PR \quad WSVG = UWSVG/PG$$

11. Decide which team shoots:
    If WSVR > WSVG then Red team shoots
    If WSVR < WSVG then Green team shoots
    If WSVR = WSVG then a tie-break is effected by an unbiased random process
12. For the shooting team, decide in which direction the shot is to be aimed:
    E.g., if Red team is shooting, decide first on the axis:
    If abs[NR − SR] > abs[ER − WR] then select the North-South axis
    If abs[NR − SR] < abs[ER − WR] then select the East-West axis
    If abs[NR − SR] = abs[ER − WR] then a tie-break is effected by an unbiased random process
    Determine the sense along this axis:
    E.g., if Red team is shooting along the North-South axis:
    If NR > SR then select North
    If NR < SR then select South
    Note: A similar method is used to determine the sense along the East-West axis. A similar method is used if Green team is shooting.
13. Determine whether the non-shooting team is blocking:
    If Red team is not shooting, and if UWSVR < 0, then Red team blocks
    If Green team is not shooting, and if UWSVG < 0, then Green team blocks

Blocking and Shooting

14. Turn off the white lamp adjacent to the gun in use. Turn on either the red lamp or the green lamp (corresponding to the shooting team's colour) adjacent to the gun in use.
15. If the non-shooting team is not blocking, go to Step 18.
16. Start the blocking timer. (This lifts the blockers and holds them up until the blocking time has elapsed.)
17. Wait until the blockers have reached their up position.
18. Fire the gun in use in the direction decided upon by the vote processing.

Scoring

19. Add 100 points to the shooting team's score.
20. Wait until the ball has left the gun in use.
21. If the blockers are not energised, go to Step 23.
22. If a blocker has been hit, add 200 to the non-shooting team's score.
23. If a rollover has been hit, add 100 to the shooting team's score and go to Step 25.
24. If a rollover has been hit, add 200 to the non-shooting team's score.
25. If either team's score is greater than or equal to 100 000, go to Step 28.
26. If the ball is not present on either gun, go to Step 21.
27. Turn off all lamps. Go to Step 3.

End of Game

28. Turn on both lamps corresponding to the winning team's colour.

What I claim is:
1. Apparatus for playing a spectator-controlled game comprising
    means constituting a playfield for playing said game;
    means constituting at least one object movable over the playfield under the control of at least three spectators when playing said game;
    at least one controllable object-influencing means for causing or modifying movement of said object over said playfield in one of a plurality of different ways, when activated by an appropriate kind of control signal;

a plurality of control means, each being operable by a respective spectator when playing said game to select and supply a desired one of a plurality of possible output signals for controlling the operation of said object-influencing means; and a decision-making logic system connected (a) to the respective said control means so as to receive therefrom said output signals selected by said spectators, and (b) to said object-influencing means so as to supply hereto in response to said received output signals and as said control signal a signal dependent on a predetermined majority of one sort of said received output signals over the other sorts of said received output signals, whereby to cause said object-influencing means to respond to the expressed wishes of a predetermined majority of the spectators operating the respective control means.

2. Apparatus according to claim 1, including spectator warning means operative, on being energised, to instruct said spectators to operate their respective control means and thereby signify by their respective said output signals their respective choices of the next action to be taken by said object influencing means; and a control circuit for energizing said warning means when required for starting or continuing a game; and wherein said logic system includes timing means operative at the expiry of a predetermined time interval following the energization of said warning means to prevent said logic system responding to any further said output signals delivered thereafter by any of said control devices, said control signal being thus a signal dependent on said predetermined majority of said one sort of said output signals over all said other output signals received in said time interval.

3. Apparatus according to claim 2, wherein said object influencing means includes at least one object propelling means arranged when activated by said control signal to propel said object over the playfield.

4. Apparatus according to claim 3, wherein said object propelling means is associated with said playfield and located at a fixed position thereon.

5. Apparatus according to claim 4, including object sensing means located at said fixed position on said playfield for sensing the presence of said object adjacent said object propelling means, and switch contacts connected in said control circuit for energizing said spectator warning means and operable by said object sensing means when said object lies adjacent said object propelling means whereby to energize said warning means.

6. Apparatus according to claim 5, wherein said means constituting said playfield comprise a member having a play surface which, when said playfield is in use, is generally horizontal and upwardly facing, said play surface being of undulating form and having formed therein at least one dip at the bottom of which is disposed said object sensing means and adjacent thereto said object propelling means.

7. Apparatus according to claim 4, wherein said object propelling means comprises an object impelling means secured to said playfield and comprising an object impelling member movably secured on said playfield and an associated actuating means responsive to said control signals for actuating said impelling member whereby to cause said object when juxtaposed with said impelling member to be struck thereby.

8. Apparatus according to claim 3, wherein (a) said object propelling means is selectively operable to cause said object to be propelled in a selected one of a plurality of possible directions in response to a respective one of a plurality of different kinds of said control signal;

(b) in each such spectator operable control means at least some of said output signals represent the respective possible directions in which said object may be propelled by said object propelling means; and (c) said logic system is arranged to supply to said object propelling means a control signal of a kind for causing it to propel said object in a direction as determined by a predetermined majority of one sort of said received output signals over all other sorts of said received output signals.

9. Apparatus according to claim 8, wherein said object propelling means is associated with said playfield and located at a fixed position thereon, and comprises a plurality of object impelling means secured to said playfield for impelling said object in the respective said directions, each such impelling means comprising an impelling member movably secured on said playfield and having an associated actuating means connected to receive from said logic system control signals of the relevant kind and operable in response to each such control signal to cause the associated impelling member to impel said object when juxtaposed therewith in the direction corresponding to said control signals of the relevant kind.

10. Apparatus according to claim 3, wherein (a) said object influencing means includes at least one object obstructing means arranged when activated by a said control signal of a relevant kind to impede the passage of said object along a path along which it is being propelled;

(b) in each such spectator operable control means one of said output signals comprises an object obstructing output signal; and (c) said logic system is connected to supply to said object obstructing means an object obstructing control signal in response to a predetermined majority of said object obstructing output signals over all other sorts of said received output signals, whereby to cause the passage of said object along said path to be obstructed.

11. Apparatus according to claim 10, wherein said object obstructing means is associated with the playfield and located at a fixed position thereon, and comprises an object obstructing member movably secured on said playfield and an associated actuating means connected to receive from said logic system said object obstructing control signals, and operable in response to each such control signal to cause said obstructing member to move temporarily from a non-obstructing position to an obstructing position.

12. Apparatus according to claim 1 including an electronically controllable visual image producing screen, wherein (a) said means constituting said playfield comprises a first electronic signal generating means connected to said screen whereby to supply thereto, when energized, electronic signals for producing on said screen a visual image simulating a said playfield;

(b) said means constituting said movable object comprises a second electronic signal generating means connected to said screen whereby to supply thereto, when energized, electronic signals for producing on said screen a visual image simulating said movable object, said second signal generating means being adapted to move said object simulating image across said screen according to predetermined movement patterns in response to control signals received thereby, (c) said object-influencing means comprises a third electronic generating means connected to said screen whereby to supply thereto, when energized, electronic signals for producing on the screen visual images simulating a plurality of object-influencing devices, said third signal generating means being adapted to vary said images in a predetermined manner in response to control signals received thereby; and (d) electronic connection means connecting said decision-making logic means with said second and third signal generating means whereby to supply said control signals produced by said logic means to said second and third signal generating means.

* * * * *